July 27, 1937.                R. G. DANIEL                2,088,026
                              VULCANIZER
                         Filed March 12, 1935        2 Sheets-Sheet 1

INVENTOR.
R.G. Daniel
BY Carlos G. Stratton
ATTORNEY

July 27, 1937.    R. G. DANIEL    2,088,026
VULCANIZER
Filed March 12, 1935    2 Sheets-Sheet 2
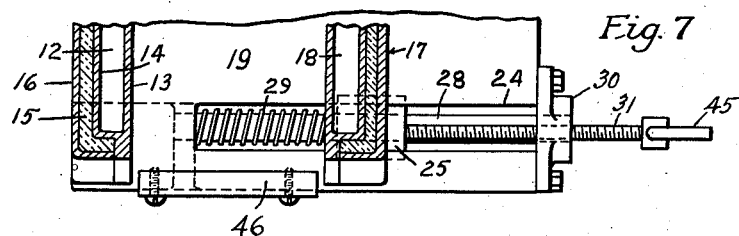
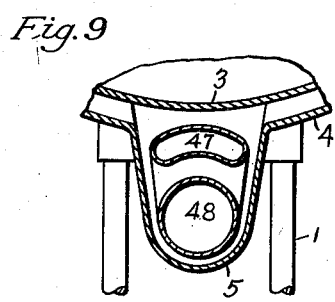
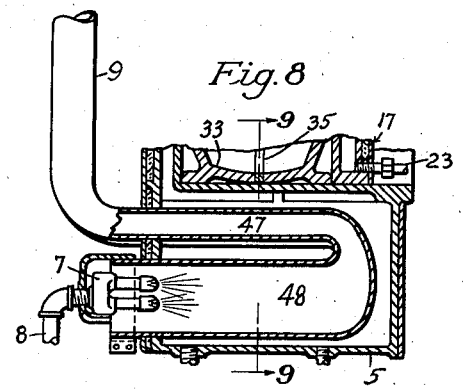
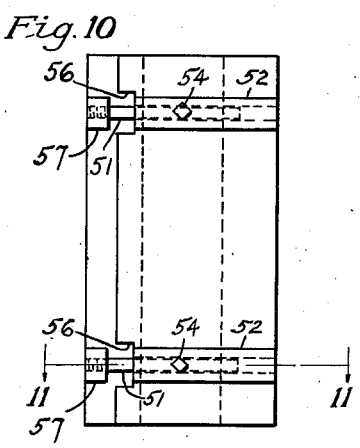
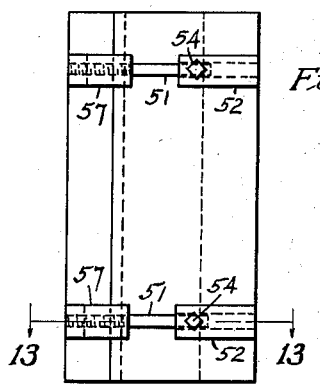
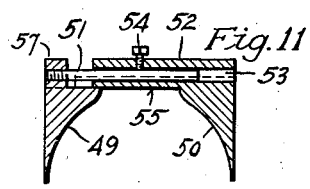
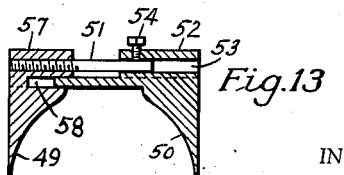
INVENTOR.
R.G.Daniel
BY Carlos G. Stratton
ATTORNEY.

Patented July 27, 1937

2,088,026

UNITED STATES PATENT OFFICE 2,088,026

VULCANIZER

Royal G. Daniel, Beverly Hills, Calif.

Application March 12, 1935, Serial No. 10,600

4 Claims. (Cl. 18—18)

My invention relates to vulcanizers, and more particularly to vulcanizers adapted to vulcanize a segment of an automobile tire casing. Reference is made to my co-pending application Serial No. 14,427, filed April 3, 1935, for subject matter shown but not claimed herein.

My invention belongs to that type of vulcanizers in which a movable wall is utilized, whereby the vulcanizer may be adjusted to treat different sizes of tires. The principal object of the invention is to provide simple yet effective means for holding the movable wall in any desired position within its range.

Another object is to provide easily operable means for moving the last-mentioned wall to its operative position.

As soon as the vulcanization is complete, the tire may be removed from the vulcanizer. However, the movable wall is still too hot to handle manually. To avoid this difficulty, it is an object of my invention to provide means for automatically moving said wall as soon as it is released.

A further object is to provide means for clamping a tire casing in the present vulcanizer, which means are quickly removable from its clamping position without the use of pivots and the like.

A still further object is to provide a close and intimate arrangement between a heating element and the mold of the vulcanizer, whereby to save manufacturing and operating costs.

Another object resides in eliminating spacer strips now necessary with bead plates, where the latter are intended to be used for different sizes of molds.

Further objects reside in novel details of construction and in novel combinations and arrangements of parts, which will appear in the course of the following description.

In the drawings, like reference characters designate similar parts in the several views.

Figure 7 is a broken plan view looking in the direction of the arrows 7—7 of Figure 6.

Figure 8 is a broken vertical section similar to Figure 1, but illustrating a modification of the heating chamber.

Figure 9 is a section taken on the line 9—9 of Figure 8.

Figure 10 is a plan of a modified construction for bead plates.

Figure 11 is a section taken on the line 11—11 of Figure 10.

Figure 12 is a plan of another modification for the bead plates.

Figure 13 is a section taken on the line 13—13 of Figure 12.

Figure 1:
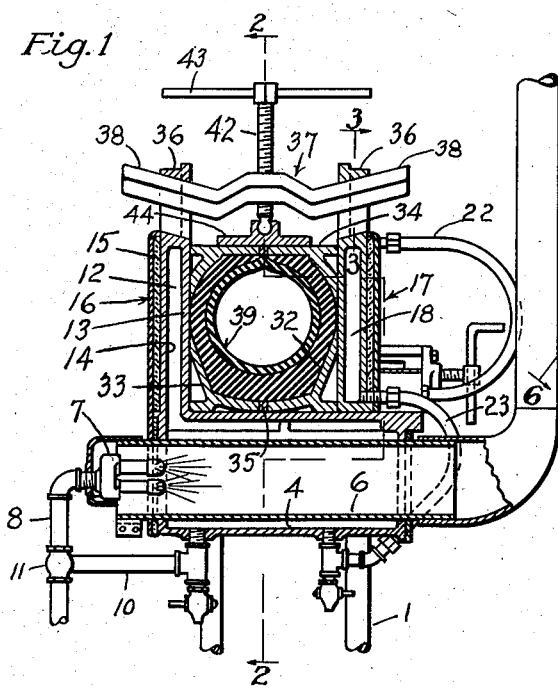
Figure 1 is a vertical sectional view of a vulcanizer embodying features of the present invention.
Figure 2:
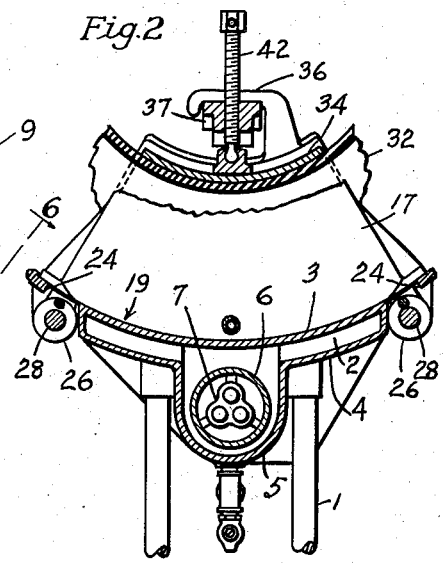
Figure 2 is a vertical section taken along the line 2—2 of Figure 1.
Figure 6:
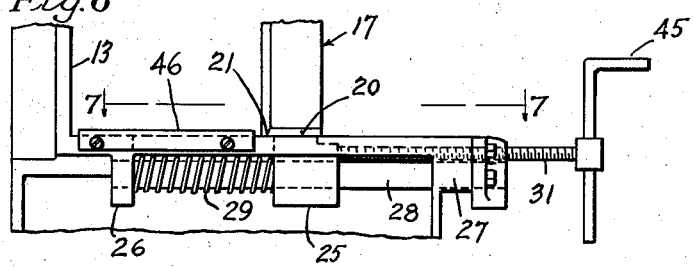
Figure 6 is an enlarged, broken elevation, looking in the direction of the arrows 6—6 of Figure 2.
Figure 3:
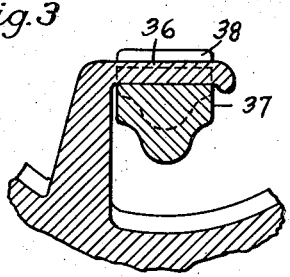
Figure 3 is an enlarged section taken on the line 3—3 of Figure 1.
Figure 4:
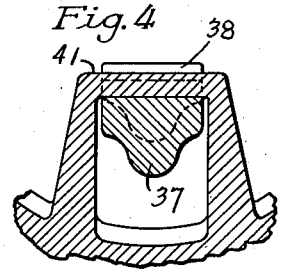
Figure 4 is a sectional view similar to Figure 3, but showing a modified construction.

Referring more in detail to the drawings, the reference numeral 1 designates legs upon which the present vulcanizer is mounted. Immediately resting on the legs is a steam boiler 2, having a horizontal chamber, comprising upper and lower walls 3 and 4 respectively. The walls are horizontally curved, and the lower wall 4 has a U-shaped trough 5 at its lowest portion.

Concentric with the curve of the U-shaped trough is a heating element, comprising a cylindrical combustion chamber 6, the ends of which are open and project from the boiler, as shown in Figure 1.

Mounted at one end of the chamber 6 is a triple-jet gas burner 7. A pipe 8 supplies fuel to the burner from a source of supply (not shown). The other end of the chamber 6 connects with a flue 9, for the exhaust of spent gases. A conduit 10 connects an automatic pressure control 11 (in the pipe 8) with the steam boiler 2, for the automatic regulation of the gas supply.

It is thought clear without further illustration that an electrical heating element may be substituted for the gas heating element.

The steam boiler has a relatively stationary wall or vertical chamber 12, connecting with the horizontal chamber. Inner and outer walls 13 and 14 (with respect to the tire cavity) define said vertical chamber. The outer wall 14 is well insulated, as indicated at 15. A plate 16 holds the insulating material in place and protects same.

Slidable on a bed 19, which is in fact the concave upper surface of the wall 3, is a so-called "movable wall", represented in its entirety by the number 17. The "movable wall" has an interior steam space 18, and is insulated similar to the outer wall 14. Edge 20 of the movable wall that engages the bed 19 is machined. It has been found sufficient and it is preferable only to machine portion 21 of said edge, which is the portion nearest the tire cavity.

Flexible conduits 22 and 23 respectively carry steam to and return condensation from the steam space 18 to the boiler 2.

For actuating the movable wall, the following mechanism is provided:

Slots 24 are provided at the sides of the bed 19, beyond the side walls of the boiler 2. The slots extend in the direction of the movement of the movable wall 17. Depending at either side from the movable wall and extending through the slots are apertured lugs 25. Mounted in heads 26 and 27 on the under side of the bed 19 are slide bars 28 projecting the apertures of the lugs 25 and upon which the lugs slide. Disposed around the bars 28 and between the beads 26 and the lugs 25 are coil springs 29, urging the movable wall away from the stationary wall 12 at all times.

The slots 24 are in practice recesses made in the bed 19 and closed at their open ends by plates 30 bolted in place. The plates 30 are shown as assisting in supporting the bars 28. In addition, the plates are tapped and carry stud bolts 31, which bear against the lugs 25, which in turn compress the springs and urge the movable wall toward the stationary wall. The bolts 31 have cranks 45 for manipulation thereof.

The bed 19 and the movable and stationary walls together provide a cavity for a tire 32. Adapter plates 33 shape the cavity to conform to the tire and bead plates 34 are superposed on the segment of the tire in the mold. Spacer strips 35 may be interposed between complementary adapter and bead plates, whereby said plates may be used with different sizes of tires. An air bag 39 is shown in the tire.

For clamping the tire and bead plates in place, hooks 36 are mounted on both the movable and stationary walls. Caught under the hooks is a cross bar or yoke 37. The ends of the cross bar are bent at an upward angle, considering it in an operative position, and the under, engaging faces of the hooks 36 are disposed similar to the pitch of the ends 38. This upward pitch of the cross bar and the engaged surfaces on the hooks provides a binding action between same when outward pressure is applied in the tire by means of increased pressure in the air bag 39.

Figure 5:
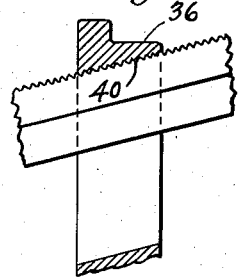
Figure 5 is an enlarged, broken view of a modification, looking in the same direction as Figure 1.

If desired, the engaging surfaces of the hooks 36 and the cross bar ends 38 may be serrated, as indicated at 40 in Figure 5, to further prevent slippage. Moreover, one of the hooks 36 may be in the form of an eye 41, if desired.

In threaded engagement with the cross bar 37 and vertical thereof in an operative position is a bolt 42 having a handle 43. The foot of the bolt has a ball and socket connection with a pressure plate 44 that clamps the tire and bed plates in the cavity between the walls.

A stop 46 is bolted at an end of the cavity, for limiting longitudinal movement of the adapter plates 33 and to facilitate arranging same. It is thought clear without illustration that adjacent ends of the adapter and bead plates may be appropriately marked in order that the same ends may always be adjacent. This is of value where the machining of such plates is done manually and hence may be ground to fit one way only.

Figures 8 and 9 illustrate a modification of the gas chamber; to wit, a return flue 47 is arranged in the boiler 2 in a sort of "hairpin" arrangement along with the combustion chamber 48. The flue may be kidney shape in section, as shown in Figure 9, to increase the radiating surface, in order to extract all the heat possible from the gases of combustion.

It will be noted that the flue in both forms shown is of smaller diameter than the combustion chamber. This arrangement provides a restricted outlet for the combustion chamber, but does not interfere with the normal draft produced by the flue.

In the modifications shown in Figures 10 to 13, inclusive, bead plates are shown that do not need spacer strips, although said plates are adaptable for different sizes of tires.

In both forms shown in Figures 10 to 13, shoulder members 49 and 50 respectively have a pin 51 and a boss 52 provided with a socket 53 to receive the pin.

A set screw 54 holds the pin and its associated shoulder 49 in position. A connecting plate 55 mounted on the shoulder 50 bridges the space between the shoulders.

In the form shown in Figures 10 and 11, the edge of the connecting plate adjacent to the other shoulder is cut out, as shown at 56 to receive bosses 57 in which the pins 51 are mounted. In the form shown in Figures 12 and 13, the shoulder 49 has a recess 58 for receiving the adjacent edge of the connecting plate.

It seems quite apparent that the improvements shown in Figures 10 to 13, inclusive, are applicable to the adapter plates as well as to the bead plates.

In the operation of the present vulcanizer, water is supplied to the boiler 2, and the gas burner is lit. The quantity of gas supplied to the burner 7 is automatically controlled by the pressure in the boiler 2, through the intermediary of the control 11. The steam pressure from the boiler is carried to the spaces within both the stationary and movable walls.

The movable wall is then moved toward the stationary wall by means of the cranks 45 and associated parts, until the cavity between the walls is approximately the thickness of the tire to be vulcanized, at its widest point. In this movement, the springs 29 are compressed.

Adapters 33, and, if needed, a spacing strip 35 are placed in the cavity, forming a mold. The portion of the tire 32 that is to be vulcanized is then placed in the mold. An air bag 39 is inserted in the tire and bead plates 34 (or such as are shown in Figures 10 and 11 or 12 and 13) are superposed on the tire.

The cross bar 37 is then caught under the hooks 36. The jack screw 42 and studs 31 are then screwed home, whereby the pressure plate 44 and the movable wall are brought into confining arrangement with respect to the tire. Air pressure is then admitted to the air bag 39.

As soon as the vulcanization is complete, the air pressure in the bag 39 is first released. Then the jack screw 42 is unscrewed and the cross bar 37 lifted out from under the hooks. The bead plates in practice are then lifted or pried out. Thereafter, the tire is withdrawn or rolled out. When it is desired to change the adapters to accommodate a different size of tire, the cranks are operated to unscrew the studs 31. The springs 29, through the intermediary of the lugs 25, move said wall away from the stationary wall automatically.

The stop 46 provides a limit for the longitudinal movement of the adapters in the bed 19. The serrations 40, when used, are an added precaution against slippage of the movable wall, although in ordinary operation it has been found that the pitch of the ends 38 of the cross bar and the similar pitch of the under surface of the hooks 36 are sufficient to prevent slippage.

If either of the improved forms of bead plates is used, such as shown on Sheet II of the drawings, an adjustment is made for them to fit the mold cavity. The adjustment is effected by sliding the pin 51 in the socket 53 and holding the bead plates in the adjusted position by means of the set screws 54.

Having thus described my invention, what I claim and desire to secure by Letters Patent is:

1. In a vulcanizer having relatively stationary and movable walls, means for holding the walls together during vulcanization, comprising fastening means on the walls, a cross bar having portions flaring with respect to said walls, said flaring portions being in binding engagement with said fastening means, and means clamping the cross bar in said engagement.

2. In a vulcanizer having relatively stationary and movable walls, means for holding the walls together during vulcanization, comprising hooks on the walls, a cross bar having end portions bent outwardly with respect to the walls, the hooks having faces of a pitch similar to said end portions, and means clamping the end portions of the cross bar in contact with said faces.

3. In a vulcanizer having relatively stationary and movable walls, means for holding the walls together during vulcanization, comprising hooks on the walls, a cross bar having portions flaring with respect to said walls, said flaring portions being in binding engagement with said hooks, and means clamping the cross bar in said engagement.

4. In a vulcanizer, the combination of spaced heating walls, a cross bar spanning the space between the walls and having portions flaring upwardly with respect to the walls, fastening means on the walls for holding the cross bar in said position, at least one of said means having an overhanging arm, unsupported at one end, one of the flaring portions of the cross bar having a laterally sliding connection with said unsupported end, and means to clamp the cross bar in said position.

ROYAL G. DANIEL.